United States Patent [19]

Hill

[11] Patent Number: 5,264,910
[45] Date of Patent: Nov. 23, 1993

[54] APPARATUS AND METHOD FOR ANGLE MEASUREMENT

[75] Inventor: Jerry M. Hill, Brentwood, Tenn.

[73] Assignee: FMC Corporation, Chicago, Ill.

[21] Appl. No.: 559,790

[22] Filed: Jul. 30, 1990
(Under 37 CFR 1.47)

[51] Int. Cl.⁵ .............................................. G01B 11/26
[52] U.S. Cl. .................................... 356/141; 356/152
[58] Field of Search ................................ 356/141, 152

[56] References Cited

U.S. PATENT DOCUMENTS

| | | | |
|---|---|---|---|
| 4,154,531 | 5/1979 | Roberts, Jr. et al. | 356/152 |
| 4,180,326 | 12/1979 | Chang | 356/152 |
| 4,319,838 | 3/1982 | Grossman et al. | 356/152 |
| 4,410,270 | 10/1983 | Zuckerman | 356/141 X |
| 4,523,844 | 6/1985 | Titsworth et al. | 356/152 |
| 4,594,789 | 6/1986 | Marino et al. | 33/288 |
| 4,804,832 | 2/1989 | Gardner | 356/141 X |
| 4,944,588 | 7/1990 | Köhler | 356/152 |

*Primary Examiner*—Mark Hellner
*Attorney, Agent, or Firm*—H. M. Stanley; R. C. Kamp; R. B. Megley

[57] ABSTRACT

Apparatus is disclosed which includes two side-by-side planar light sensors. A light stop is spaced from one light sensor in position to stop or shade half of the light sensor surface from a projected light beam when the beam is orthogonal thereto. The other light sensor is completely exposed to the projected light beam. The one light sensor is exposed to more or less of the light beam dependent upon the beam's departure in one direction or the other from orthogonality to the plane of the one light sensor. A ratio of the output from the one light sensor to the output from the other provides beam angle information relative to the plane of the one light sensor.

12 Claims, 1 Drawing Sheet

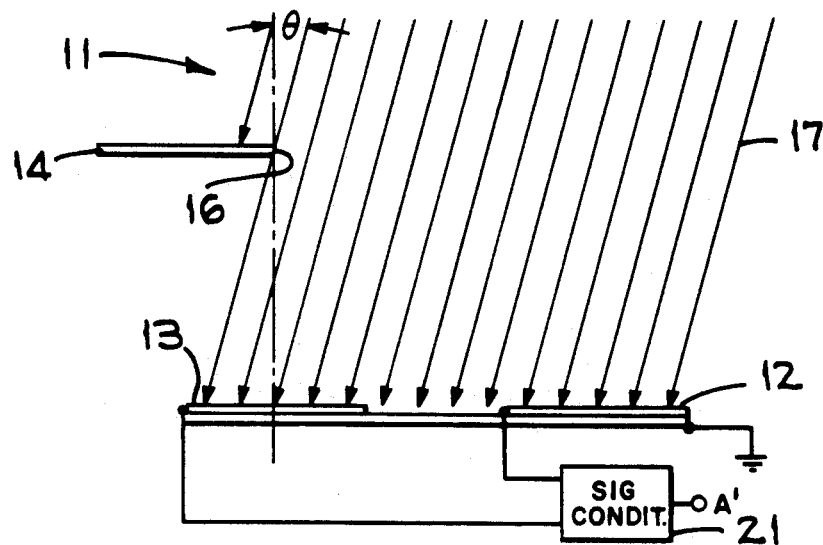
FIG_1
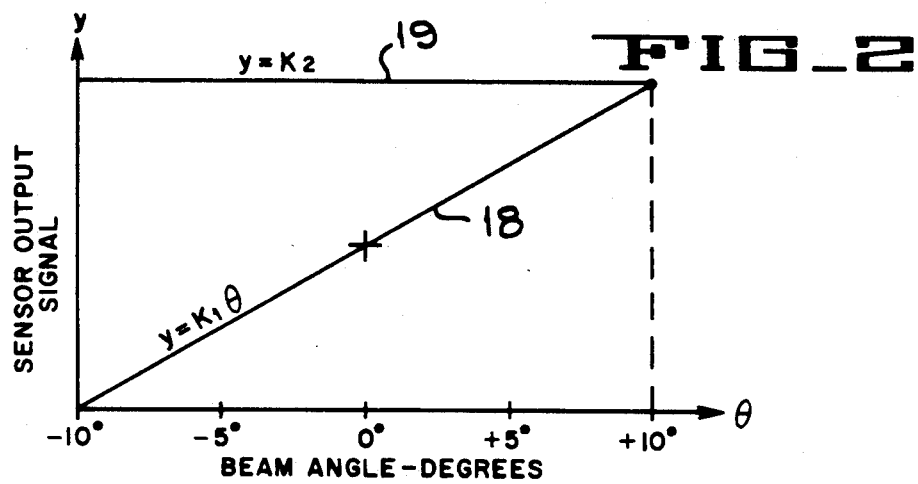
FIG_2
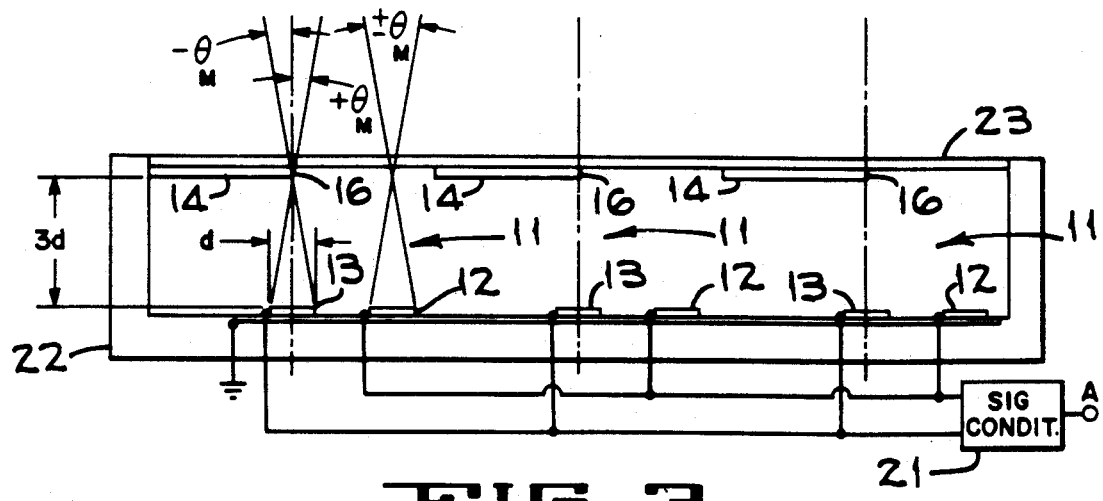
FIG_3

APPARATUS AND METHOD FOR ANGLE MEASUREMENT

SUMMARY OF THE INVENTION

This invention relates to an angle sensing apparatus for detecting the angle between the apparatus and a projected photo energy beam. The combination includes a photo energy stop, a primary photo energy sensor spaced from the stop and positioned to receive a portion of the photo energy beam, which portion is transmitted past the edge of the stop to thereby provide a signal output which is indicative of the portion of the primary sensor exposed to the impinging beam portion, and a reference photo energy sensor positioned adjacent to the primary photo energy sensor. The reference sensor has a substantially constant area continuously exposed to the projected photo energy beam to thereby provide a signal output which is indicative of the projected beam intensity. Further, means is included for combining the primary and reference photo energy sensor signal outputs to provide resulting signal output which is indicative of the angle at which the impinging photo energy beam intercepts the primary photo sensor.

In another aspect of the invention apparatus is disclosed for determining the angle between a projected light energy beam and a body, which includes a primary projected light energy sensor affixed to the body, wherein the primary sensor provides output according to the sensor area upon which the projected light energy beam impinges. A reference sensor is attached to the body adjacent to the primary sensor, wherein the reference sensor area is continuously exposed to the projected light energy beam thereby and provides an output signal representative thereof. A light energy beam stop is spaced from the primary projected light energy sensor and is disposed to shadow a portion of the primary sensor from the projected light energy beam. The portion of the surface of the primary sensor which is impinged by the light energy beam is dependent upon the angle between the projected beam and the primary sensor. Means is provided for receiving the primary and the reference sensor output signals and for providing an angle indicative output corrected for variation in the projected light energy beam intensity.

In yet another aspect of the invention, apparatus is disclosed for measuring the angle of impingement of a projected beam wherein the combination includes a first beam sensor exposed to varying extent to the projected beam and a second beam sensor adjacent to and coplanar with said first beam sensor which is continuously exposed to the projected beam. The first and second beam sensors provide first and second signal outputs respectively which are substantially proportional to the area thereof upon which the projected beam impinges. A projected beam stop is spaced from the first beam sensor and positioned to block a portion of the projected beam from the first beam sensor to provide the varying extent of exposure thereof in accordance with the angle between the projected beam and the first beam sensor surface. Means is provided for receiving the first and second signal output and for providing an output indicative of the angle between the projected beam and the first beam sensor which is compensated for projected beam intensity variations.

A method of the present invention provides for measurement of the orientation angle of a body relative to the direction of a projected beam which includes the steps of receiving a constant portion of the projected beam at one beam sensor and providing a sensor output as well as stopping a portion of the beam from being received at another beam sensor adjacent to the one beam sensor. The portion of the other beam sensor which is impinged by the projected beam depends on the angle between the beam and the other beam sensor which thereby provides another sensor output. Also included is the step of calculating the ratio of the other beam sensor output to the one beam sensor output, whereby the ratio is indicative of the angle between the beam and the other beam sensor compensated for variation in beam intensity.

BRIEF DESCRIPTION OF THE DRAWINGS

FIG. 1 is a diagram showing the principle of the present invention.

FIG. 2 is a graph showing the photo sensor output as a function of beam angle.

FIG. 3 is a diagram of a multiple sensor embodiment of the present invention.

DESCRIPTION OF THE PREFERRED EMBODIMENT

With reference to FIG. 1 of the drawings a sensor assembly 11 is shown having a reference photo sensor 12, a primary photo sensor 13, and a beam stop 14. The beam stop is an opaque member which is spaced from the primary photo sensor 13 having one edge 16 generally overlying the centerline of the primary photo sensor. The photo sensors 12 and 13 are typically planar devices which provide an output signal proportional to the portion of the sensor surface which is flooded with light. The output is also a function of the intensity of the light which floods the sensor surface areas. As used in this disclosure, the term "light" or "photo energy" includes the invisible as well as the visible portions of the spectrum.

It may be seen that the reference and primary photo sensors 12 and 13 are arranged in substantially the same plane with the stop 14 providing interruption of or shadowing from a beam of light or photo energy 17 as it proceeds toward the surface of the primary photo sensor. The reference photo sensor 12 receives all of or some relatively constant amount of the light energy in beam 17 as shown in FIG. 1. Reference photo sensor 12 provides an output signal which will vary to some extent as a function of the intensity of the light beam 17. The intensity of beam 17 at the photo sensor may be varied by variation of the distance between the light source and the sensor or by variations in the characteristics or excitation of the beam projector. As the intensity of the light beam 17 varies for any of these reasons, the intensity of the beam as it impinges both the primary photo sensor 13 and the substantially adjacent reference photo sensor 12 will be substantially the same. Therefore, the output from the primary photo sensor 13 as a result of the amount of the light beam 17 which impinges thereupon may be combined with the output from the reference photo sensor 12 to form a ratio of the outputs which is indicative of the angle between the primary photo sensor and the light beam 17 as will be hereinafter described.

For small angles, the tangent and sine of an angle is similar. Therefore, if a perpendicular is projected from the surface of the primary photo sensor 13 and the light beam 17 is projected in the direction of the perpendicular, the angle $\theta$ as seen in FIG. 1 is zero. With the stop 14 located as shown in FIG. 1 so that the edge 16 thereof is at the perpendicular extending from the centerline of the primary photo sensor 13, half of the surface area of the primary photo sensor is flooded by the beam 17 and half is shaded and maintained in darkness by the opaque stop 14. As a consequence, for the existing intensity of the beam 17 under these conditions, one half of the potential output from the primary photo sensor will be generated. In the mean time, all of the potential output will be generated by the reference photo sensor 12 for the same conditions. This presumes the two sensors have similar scale factors. The ratio, therefore, of the output of the primary sensor to the output of the reference sensor will be 0.5. This may be seen with reference to FIG. 2, wherein at 0° of beam angle the output 18 from primary photo sensor 13 is one-half of the output 19 from reference photo sensor 12. The output from the reference sensor is essentially constant for the same intensity of the light beam 17. This is represented by the relationship $y = K_2$ as indicated at 19 in FIG. 2. The output from the primary photo sensor 13, however, may be seen to go from zero at one end of a 20° range to a level equivalent to the constant output from the reference sensor at the other end. A 20° range of angle measurements is deemed appropriate for the purposes of this particular angle measurement apparatus as it applies to vehicle wheel alignment applications. The 20° of angle is measured plus and minus 10° either side of the perpendicular which extends from the centerline of primary sensor 13 past the edge 16 of the opaque stop 14.

As the angle of the beam 17 travels from a position 10° counterclockwise from the perpendicular extending from the centerline of primary sensor 13 to a position 10° clockwise from the perpendicular, the curve $y = K_1 \theta$ (line 18) of FIG. 2 is generated. Variations in the intensity of the beam 17 are therefore eliminated from the angle measurement by using the relationship which is proportional to the angle of the beam 17 within the range of plus and minus 10° from the perpendicular extending from the surface of sensor 13: $K_1 \theta / K_2$. A signal conditioning circuit 21 shown in FIG. 1 accomplishes this combination and provides as an output at A' a signal which is indicative of the angle $\theta$ within the range of plus and minus 10° from the perpendicular or zero angle direction of the light beam 17. As illustrated in FIG. 1, the beam 17 illuminates all of the surface on both the primary and the reference sensors 13 and 12 respectively. FIG. 1 therefore represents an angle of +10° as seen in FIG. 2. The output from signal conditioner 21 is $K_1 \theta / K_2$, (wherein $K_1/K_2 = 1$ and $\theta$ is 20° as hereinbefore explained) indicative of the +10° condition.

With reference now to FIG. 3 of the drawings, an angle sensor is shown having a plurality of sensor assemblies 11 with a plurality of primary photo sensor cells 13 and reference photo sensor cells 12 disposed in substantially the same plane within a case 22 for the entire sensor assembly of FIG. 3. A glass cover 23 supports a plurality of the opaque beam stops 14, one stop for each pair of sensors 12 and 13. It may be seen that the reference sensors 12 are exposed to the light beam throughout the angle measurement range, $\theta = 20°$ (expressed as plus and minus 10° here). The primary photo sensor 13 in each pair of photo sensors is arranged to be exposed to the beam 17 in accordance with the angle between the case 22 and the beam 17 to thereby provide a measurement of angle as explained in conjunction with FIGS. 1 and 2 herein. For a 20° range of angle measurement, the optimum dimensional characteristics for the case 22 are defined. The sine of 20° is 0.342. Therefore, if the width of a sensor 13 is d, the spacing distance between the surface of the primary photo sensor 13 and the opaque stop 14 is 3 d. The range of the angle measurement device as it travels through a 20° arc will therefore cause the light beam 17 to sweep across the portion of face of the primary photo sensors 13 which is intercepted by the 20° arc. This will be approximately the entire face of the primary sensor in this example, but a lesser portion of the face may be traversed by the beam for adjustment or other purposes, provided that accompanying adjustments are made with regard to the reference sensor or the reference output. The outputs from each of the primary sensors 13 is connected to a signal conditioner 21 as are each of the reference outputs from reference sensors 12. The plurality of sensor assemblies 11 will tend to remove or average individual sensor assembly 11 idiosyncracies from the measurements and provide an output signal A which is indicative of the angle of the light beam 17 relative to the case 22 containing the primary photo sensors 13.

Typical photo sensors for use in this application are exemplified by the photocell sensor part number 5359C002 manufactured by Silicon Sensors, Inc., Highway 18 East, Dodgeville, Wis. The signal conditioning circuit 21 has been used in similar applications and is described for the purpose of disclosing the best mode and assuring completeness of this disclosure. The light beam 17 is modulated at some frequency, approximately 15 KHz for example, and the signals from photo sensors 12 and 13 are conducted to a narrow band filter which passes the 15 KHz signals. This substantially eliminates ambient light generated signals from the sensors 12 and 13. The resulting 15 KHz signal is integrated to obtain a DC level. The filtering and integration is performed independently for each sensor 12 and 13. The two DC analog signals are compared differentially providing the output signal at A' and A which is indicative of the angle $\theta$ is hereinbefore described.

Although the best mode contemplated for carrying out the present invention has been herein shown and described, it will be apparent that modification and variation may be made without departing from what is regarded to be the subject matter of the invention.

What is claimed is:

1. Angle sensing apparatus for detecting the angle between the apparatus and a projected photo energy beam, comprising a photo energy stop, a primary photo energy sensor spaced from said stop and positioned to receive a portion of the photo energy beam which is transmitted past the edge of said stop thereby providing a signal output indicative of the portion of the primary sensor exposed to the impinging beam portion, a reference photo energy sensor positioned free of shadowing by said photo energy stop and adjacent said primary photo energy sensor, said reference sensor having a substantially constant area continuously exposed to the projected photo energy beam, thereby providing a signal output indicative of beam intensity, and means for combining said primary and reference photo energy sensor signal outputs to provide resulting signal output indicative of the angle at which the impinging photo energy beam intercepts said primary photo sensor.

2. Angle sensing apparatus as in claim 1 wherein the spacing between said stop and said primary photo energy sensor is approximately three times the width of said primary sensor.

3. Angle sensing apparatus as in claim 1 wherein said stop and said primary sensor are substantially planar and are situated in substantially parallel planes and wherein the edge of said stop is situated substantially over the centerline of said primary sensor.

4. Angle sensing apparatus as in claim 1 comprising a plurality of primary photo energy sensors spaced each from one of a plurality of said stops, and a plurality of reference photo energy sensors.

5. Apparatus for determining the angle between a projected energy light beam and a body, comprising
   a primary projected light energy sensor affixed to the body, said primary sensor providing output according to the sensor area upon which the projected light energy beam impinges,
   a reference sensor attached to the body adjacent to said primary sensor, said reference sensor area being continuously exposed to a constant portion of the projected light energy beam regardless of the angle of the projected light beam and providing an output signal representative of light beam intensity,
   a light energy beam stop spaced from said primary projected light energy sensor and disposed to shadow a portion of the primary sensor from the projected light energy beam, said portion being dependent upon the angle between the projected beam and said primary sensor, and
   means for receiving said primary and reference sensor output signals and for providing an angle indicative output corrected for variation in projected light energy beam intensity.

6. Apparatus as in claim 5 wherein said primary sensor and beam stop are planar members and are in substantially parallel planes.

7. Apparatus as in claim 6 wherein said reference sensor is a planar member and is located in the same plane as said primary sensor.

8. Apparatus as in claim 5 comprising a plurality of primary projected light energy sensors, a plurality of reference sensors, and a plurality of light energy beam stops spaced from each of said primary sensors.

9. Apparatus for measuring the angle of impingement of a projected beam comprising
   a first beam sensor exposed to varying extend to said projected beam dependent upon angle of impingement,
   a second beam sensor adjacent to and coplanar with said first beam sensor and being continuously exposed to said projected beam without regard to angle of impingement, 'said first and second beam sensor providing first and second signal outputs respectively which are substantially proportional to the area thereof upon which the projected beam impinges,
   a projected beam stop spaced from said first beam sensor and positioned to be free of shadowing said second beam sensor from the projected beam and to block a portion of the projected beam from said first beam sensor to provide the varying extent of exposure thereof in accordance with the angle between the projected beam and said first beam sensor, and
   means for receiving said first and second signal outputs and for providing an output indicative of the angle between the projected beam and said first beam sensor which is compensated for projected beam intensity variation.

10. Apparatus as in claim 9 wherein said first beam sensor comprises a plurality of first beam sensors, said second beam sensor comprises a plurality of second beam sensors, and said projected beam stop comprises a plurality of stops spaced one each from said plurality of first beam sensors.

11. Apparatus as in claim 9 wherein said spacing between said first beam sensor and said beam stop is approximately three times the width of said first beam sensor.

12. A method of measuring the orientation angle of a body relative to the direction of a projected beam comprising the steps of
   receiving a constant portion of the projected beam at one beam sensor regardless of angle of projected beam impingement thereon and providing a sensor output indicative of beam intensity.
   stopping a portion of the beam from being received at another beam sensor positioned adjacent the one beam sensor, wherein the portion of the other beam sensor which is impinged by the projected beam depends on the angle between the beam and the other beam sensor, thereby providing another sensor output, and
   calculating the ratio of the other beam sensor output to the one beam sensor output, whereby the ratio is indicative of the angle between the beam and the other beam sensor compensated for variation in beam intensity.

* * * * *